(12) United States Patent
Peter et al.

(10) Patent No.: US 10,392,829 B2
(45) Date of Patent: Aug. 27, 2019

(54) SMART FENCE

(71) Applicants: Vega Peter, McKinney, TX (US); Peter Lakmanaswamy-Bakthan, McKinney, TX (US); Veena Peter, McKinney, TX (US)

(72) Inventors: Vega Peter, McKinney, TX (US); Peter Lakmanaswamy-Bakthan, McKinney, TX (US); Veena Peter, McKinney, TX (US)

(73) Assignees: Peter Lakmanaswamy-Bakthan, Chennai (IN); Vega Peter, McKinney, TX (US); Veena Peter, Chennai (IN)

( * ) Notice: Subject to any disclaimer, the term of this patent is extended or adjusted under 35 U.S.C. 154(b) by 255 days.

(21) Appl. No.: 15/371,570

(22) Filed: Dec. 7, 2016

(65) Prior Publication Data
US 2018/0094451 A1   Apr. 5, 2018

Related U.S. Application Data

(60) Provisional application No. 62/404,199, filed on Oct. 5, 2016.

(51) Int. Cl.
| | |
|---|---|
| *E04H 17/14* | (2006.01) |
| *H04M 1/725* | (2006.01) |
| *F41H 11/08* | (2006.01) |
| *G05B 19/042* | (2006.01) |
| *E04H 17/16* | (2006.01) |
| *F41H 13/00* | (2006.01) |

(52) U.S. Cl.
CPC ............. *E04H 17/14* (2013.01); *E04H 17/16* (2013.01); *F41H 11/08* (2013.01); *G05B 19/042* (2013.01); *H04M 1/72527* (2013.01); *F41H 13/0018* (2013.01)

(58) Field of Classification Search
CPC .............................. G08B 13/122; E04H 17/14
USPC .......................................................... 256/10
See application file for complete search history.

(56) References Cited

U.S. PATENT DOCUMENTS

| | | | | |
|---|---|---|---|---|
| 6,036,175 A * | 3/2000 | Harper | ................... | A01K 3/005 |
| | | | | 256/1 |
| 6,504,479 B1 * | 1/2003 | Lemons | ............ | G07C 9/00087 |
| | | | | 340/430 |
| 6,937,151 B1 * | 8/2005 | Tapanes | ............... | G08B 13/124 |
| | | | | 250/227.19 |
| 7,068,166 B2 * | 6/2006 | Shibata | ................ | G08B 13/124 |
| | | | | 250/216 |
| 7,385,506 B2 * | 6/2008 | Shibata | ................ | G08B 13/124 |
| | | | | 250/227.16 |
| 8,710,983 B2 * | 4/2014 | Malkowski | ............ | G08B 13/22 |
| | | | | 340/539.1 |
| 9,779,598 B2 * | 10/2017 | DiPoala | ........... | G08B 13/19619 |

(Continued)

*Primary Examiner* — Joshua T Kennedy

(57) ABSTRACT

A remotely controlled fence includes one or more sensors for sensing an unauthorized entry; an image capturing device to capture the image of the unauthorized object; a speaker; a microphone; a humidifier to create a chill out area; a display unit for showing the weather temperature of the surroundings; a radio FM device for a musical chanson and a medium for news to the listener; a lighting unit; solar panel hoods; and a communication interface to transmit the related information to the user, the fence is optimized to control all functions using a mobile app or a web technology with a user interacting device such as a computer, tablet, smartphone and the like.

16 Claims, 6 Drawing Sheets

(56) References Cited

U.S. PATENT DOCUMENTS

| | | | | |
|---|---|---|---|---|
| 9,861,092 B2* | 1/2018 | Purpura | ................ | A01M 29/16 |
| 2008/0111687 A1* | 5/2008 | Husmann | ............. | G08B 13/122 |
| | | | | 340/552 |
| 2014/0375453 A1* | 12/2014 | Chamoux | ............ | G08B 13/122 |
| | | | | 340/541 |
| 2017/0321447 A1* | 11/2017 | Her | ........................ | E01D 19/10 |

* cited by examiner

SMART FENCE

FIELD

The present disclosure relates to a remotely operated electronic fence boundary or "smart fence" using a mobile app or other like means for internet based connectivity and/or internet based control.

BACKGROUND

Generally, fences are made from common materials such as wood. Albeit, wooden fences typically have an attractive initial appearance, but maintaining that initial appearance may require significant investment and restoration because of weathering. Accordingly, the rotted or damaged portion of the fence may have to be repaired or replaced. Thus, conventional wooden fences frequently require periodic maintenance, which is time consuming and may be relatively expensive. In addition, the fence may be compromised in securing the protected area.

A fenced area may also secure a public or commercial site from the possibility of theft and/or espionage. High value assets are frequently protected by wire fences or solid walls, but are susceptible to security loop holes and the fence can be surmounted or penetrated by a determined intruder. Thus, various high value assets owned by the military, government, utility companies, corporations or private entities may be at risk.

U.S. Patent Application No. 20080237558 A1 discloses an interwoven, adhesive backed, electric fence barrier ribbon and tape and a method of weaving thereof. The electric fence barrier is adaptable in terms of the degree of electric shock deterrence needed.

U.S. Patent Application No. 20130345876 A1 describes a robotic system and methods for tending, manipulating, engaging, acting upon, observing and/or monitoring objects and conditions in a defined volume or space ("work space") in or overlying a target area. The robotic system includes a mobile robot supported by or suspended from suspension cables secured to spaced apart anchor locations.

U.S. Pat. No. 8,193,936 B2 relates to a solar powered perimeter beam security system comprising a plurality of spaced towers. The towers have detection beams extending between them for detecting an intruder when at least one of the detection beams is interrupted. Each of the towers communicates with a remote unit.

The aforementioned prior art and other conventional fencing systems or methods aim to achieve a sufficient level of security. However, these solutions also include a number of limitations and shortcomings. The above mentioned prior art are limited in surveillance capability by limiting the monitoring of objects confined to a defined and targeted area, such as a limited perimeter of the fence. In some cases, the fencing system is outfitted with detection equipment such as a camera or other like imaging. The camera may be linked to a controller and/or computing system. However, these systems and methods have an inability to capture a plurality of images or panorama of an intruding object within a determined vicinity of the electric fence system. Furthermore, these electric fence systems lack a system of integrated sensors to monitor and determine a location of an object into the monitored area. In general, these systems provide an insufficient level of security and are unable to accommodate real time user control and most often include a stand-alone monitoring system that is not able to be remotely controlled by a user. Thus, such conventional methods lack real time human intervention from a device in a remote location such as by using a mobile application or another internet based technology.

Accordingly, there remains a need in the prior art to improve conventional fencing for an improved level of security by monitoring and controlling the fenced area remotely by a mobile app or internet based technology.

SUMMARY

In the view of the shortcomings described in the electric fence systems of the prior art, the present disclosure provides an improved remotely controlled electronic "smart" fence. As such, the general purpose of the present disclosure, which will be described subsequently in detail, is to provide a new and improved remotely controlled electronic fence further comprising one or more means for deterring an unwanted intruder, animal, and/or object. Further, the remotely controlled electronic smart fence may include system components for creating a pleasing environment including but not limited to musical audio and/or a lighting unit system.

The further inventive aspects can be embodied in a remotely controlled electronic smart fence system using a mobile app or web connectivity. The at least one remotely controlled application may include multiple functionalities such as, by not limited to, a noise tailored to deter an intruder, animal, and/or object. A further functionality may include control of a lighting system, and/or a musical audio system. The electronic smart fence is intended to be interactive and operable using varied and updatable applications as a need arises.

The other inventive aspects can be embodied in an electronic fence apparatus that comprises at least one of a means for sensing, an image capturing device, a speaker, a microphone, a humidifier, a display unit, a display interface, a radio FM device, a lighting system and/or unit, at least one solar panel unit such as one or more solar panel hoods used in conjunction with an electrical power system, and a communication system and/or a communication system interface. Further, the multiple functionalities of the fencing system may be optimized for remote control that uses a mobile app or internet based communication technology with a user interfacing device such as computer, tablet, smartphone, and other like devices.

Yet other inventive aspects can be embodied in an electronic fence system which can be controlled remotely using a means for providing a communication interface, wherein, the means, at least in part, for the communication interface is a mobile application and/or a web technology for providing the user control by a real time secured network data communication to the installed fence in a required monitored area.

The further inventive aspects can be embodied in at least one sensor or sensor system with the electronic fence configured to detect an unauthorized entry in a monitored area and further, upon detection, to send an alert to at least one user with at least one captured image of the monitored area using at least one image capturing device. The alert may be sent using a mobile app and/or internet communication.

The other inventive aspects can be embodied in an electronic fence mounted audio projecting and recording system to provide a warning in response to an unauthorized and/or unwanted intrusion such as may include a detected change in the local environment. Further, at least one microphone may provide an audio recording and/or detection for an unauthorized and/or unwanted intrusion. In addition, the at least one microphone may provide a speaker system for at least one user. The speaker system may be used at the site of the electronic fence or remotely via wireless communication.

Yet other inventive aspects can be embodied in an electronic fence musical audio system to provide pleasing and/or festive musical entertainment for a festive and/or formal occasion. This musical entertainment may be integrated with a lighting display and/or show to make the electronic fence area visually pleasing and/or more accommodating for at least one user.

The further inventive aspects can be embodied in an electronic fence which is further configured to be integrated with one or more solar panel systems, such as one or more solar panel hoods for providing power to the electronic fencing system. This solar panel system may power one or more humidifiers and/or misting devices to affect the humidity and/or temperature of the electric fence environment. Such devices may be used to cool the electric fence area during hot weather.

It is another object of the present disclosure to provide an electronic fence manufactured from a material suitable for extreme temperature ranges including, but not limited to, −30 degree Celsius to 120 degree Celsius. The materials may further be colorful, robust, hardened, tough, non-rustic, and/or a user modifiable material.

In this respect, before explaining at least one embodiment of the inventive aspect in detail, it is to be understood that the disclosure is not limited in its application to the details of construction and to the arrangements of the components set forth in the following description or illustrated in the drawings. The disclosure may provide other embodiments that can be practiced and carried out in various ways. Also, it is to be understood that the phraseology and terminology employed herein are for the purpose of description and should not be regarded as limiting.

These together with other objects of the disclosure, along with the various features of novelty which characterize the inventive aspects, are pointed out with particularity in the disclosure. For a better understanding of the disclosure, its operating advantages and the specific objects attained by its uses, reference should be made to the accompanying drawings and descriptive matter in which there are illustrated preferred embodiments.

BRIEF DESCRIPTION OF THE DRAWINGS

The embodiments of the invention are illustrated by way of example, and not by way of limitation, in the figures of the accompanying drawings.

DETAILED DESCRIPTION

In the following detailed description, reference is made to the accompanying drawings which form a pan hereof, and in which is shown by way of illustration specific embodiments in which the disclosure may be practiced. These embodiments are described in sufficient detail to enable those skilled in the art to practice the disclosure, and it is to be understood that the embodiments may be combined, or that other embodiments may be utilized and that structural and logical changes may be made without departing from the spirit and scope of the present disclosure. The following detailed description is, therefore, not to be taken in a limiting sense, and the scope of the present disclosure is defined by the appended claims and their equivalents.

Figure 1A:
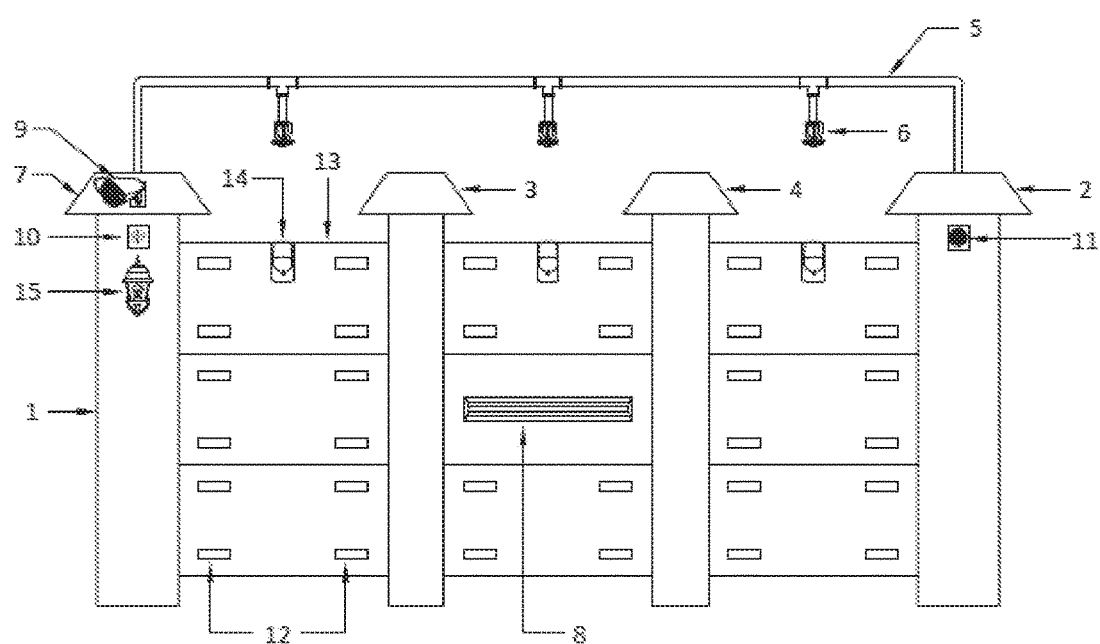
FIG. 1A shows apparatus for providing remotely operated smart fencing, in accordance with an example embodiment.

FIG. 1a shows a remotely controlled electronic smart fence. The smart fence may comprise at least one solar panel, such as solar panel hoods (2, 3, 4, 7). The solar panel hoods may be mounted on vertical posts (1) that support the fence structure and provide power via an electrical connection (5) for other components of the electronic fence. The solar panel hoods may power a misting and/or humidifying device (6), which can provide a chilling area using a cooling spray for at least one user on a hot day. The smart fence may include a plurality of slots, such as the horizontal slots (12) shown in FIG. 1a. The slots may be used to reduce wind pressure on the electronic fence structure.

FIG. 1a further shows at least one image gathering device (9), such as a camera. The at least one image capturing device may be used to prevent unauthorized entry by capturing at least one image of the unauthorized object. The electronic smart fence may further comprise at least one speaker (10) for at least one user. The at least one speaker may be used separately or in conjunction with a least one microphone (11). The at least one microphone may provide an audio recording and/or detection for an unauthorized and/or unwanted intrusion. Thus, unauthorized objects or activities may be transmitted to a remote location using a mobile app and/or other internet based communication.

FIG. 1 shows devices for creating an entertaining and/or pleasing environment in the vicinity of the electronic fence. The electronic fence may include musical entertainment by providing an audio system (10) to provide pleasing and/or festive musical entertainment for a festive and/or formal occasion. The electronic fence may further include at least one radio FM device for a musical audio or audio entertainment, including such audio as news for at least one user. The musical audio system and/or radio may be integrated or separate from the speaker and/or audio recording system. This musical entertainment may be integrated with or separate from at least one lighting unit (8, 14, 15). The lighting unit may provide light for entertainment purpose and/or to make the electronic fence area visually pleasing and/or more accommodating for at least one user. The at least one lighting unit may provide light for safety, security, and/or to deter unauthorized intruders. The at least one lighting unit may comprise LED lighting, fluorescent lighting, incandescent lighting, and other like lighting units. Further, the lighting unit may be powered with the at least one solar unit (2, 3, 4, 7). Further, the electronic fence is optimized to transmit and receive information from a mobile app or a web technology via at least one user at a remote location to control the aforementioned functions. The at least one user may control all the functions using a computer, tablet, smartphone, and other like devices. Furthermore, the electronic fence may include updatable applications and acquire new functionalities as desired by the at least one user.

FIG. 1a further shows, a remotely controlled smart fence having a means for sensing which is connected to an image capturing device, audio device, and other like devices, wherein the remotely controlled electronic fence may be activated or transmit a notification when detecting any unauthorized entry into the monitored area. FIG. 1a shows how the inventive aspects described are effectively engaged with the inbuilt structure of the fence to monitor and observe at least one intruder and/or object.

In accordance with an example embodiment, the remotely controlled smart fence includes a plurality of parallel portions that are configured to extend to fence a contour area.

In accordance with an embodiment of the present disclosure, the panels of the fence are, but not limited to, interchangeable colors, operably designed for concealed wiring which may traverse through the holes in the panels of the fence in a horizontal or vertical direction. Further, the panels of the fence include at least one slot and preferably a plurality of slots (12) to reduce and withstand the wind pressure. The electronic fence can withstand extreme temperature in the range of, but not limited to, −30 to +120 degrees Celsius. The electronic fence may further include materials that are non-corrosive and/or weather resistant to mitigate degradation.

Figure 1B:
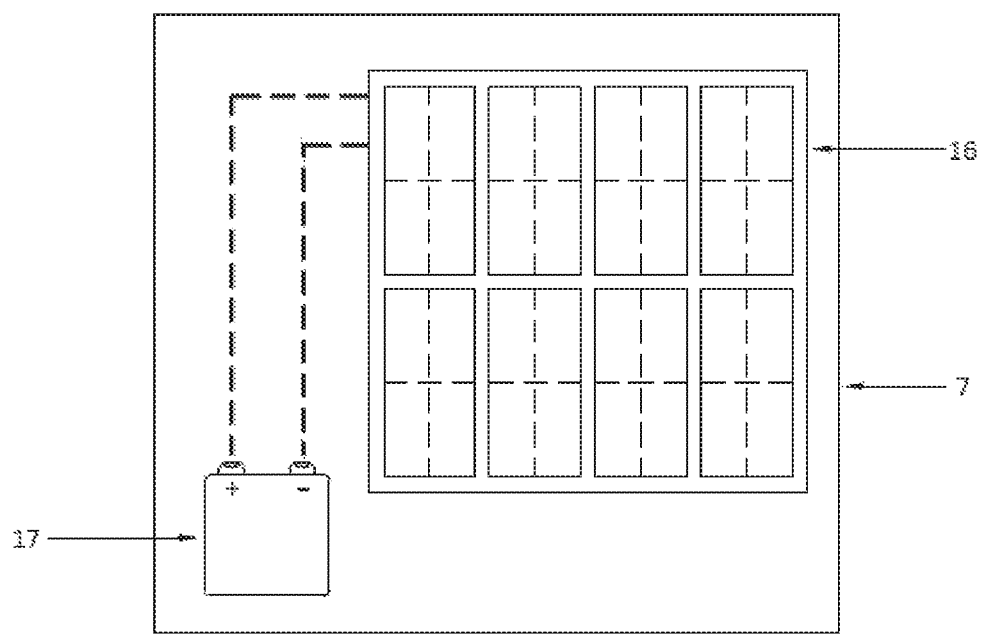
FIG. 1B shows a power storage and dispersal system connected to a solar panel hood, in accordance with an example embodiment.

FIG. 1b shows a power supply system (7) including a power supply storage unit (17). The power supply system may include at least one solar panel unit and preferably a plurality and solar panel units (16). The plurality of solar panel units may include solar panel hoods, which may be mounted on each pillar (1) of the fence as a power supply source.

Figure 2:
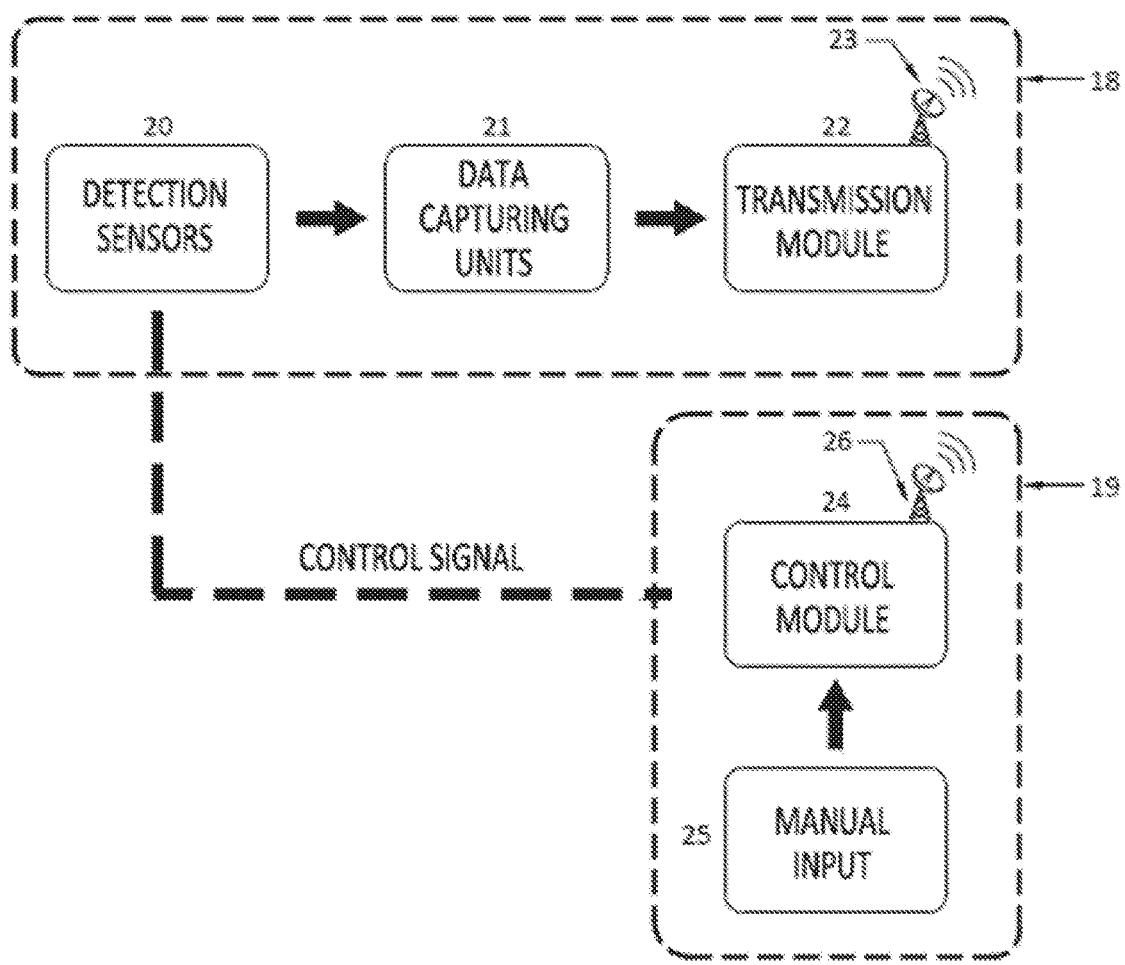
FIG. 2 shows the components of an electric smart fence system, in accordance with an example embodiment.

FIG. 2 is a flowchart which shows one or more communications between the electronic fence (18) and at least one remote user (19). The electronic fence consists of detection sensors (20), which provide sensor data to one or more data capturing units (21). The data capturing units (21) may integrate and process the sensor data, which may subsequently be transmitted to one or more transmission modules (22) that may transmit the sensor data by way of wireless communication (23) to at least one user (19). The at least one user may receive the control signal via a wireless device (26), such as a mobile app or other like internet based application. The sensor data receive via the control module (24) may be integrated and presented to the at least one user. The at least one user may provide manual input (25) to the control module (24) to make at least one determination regarding the sensor data and also to transmit one or more control signals to the electronic fence (18).

Figure 3:
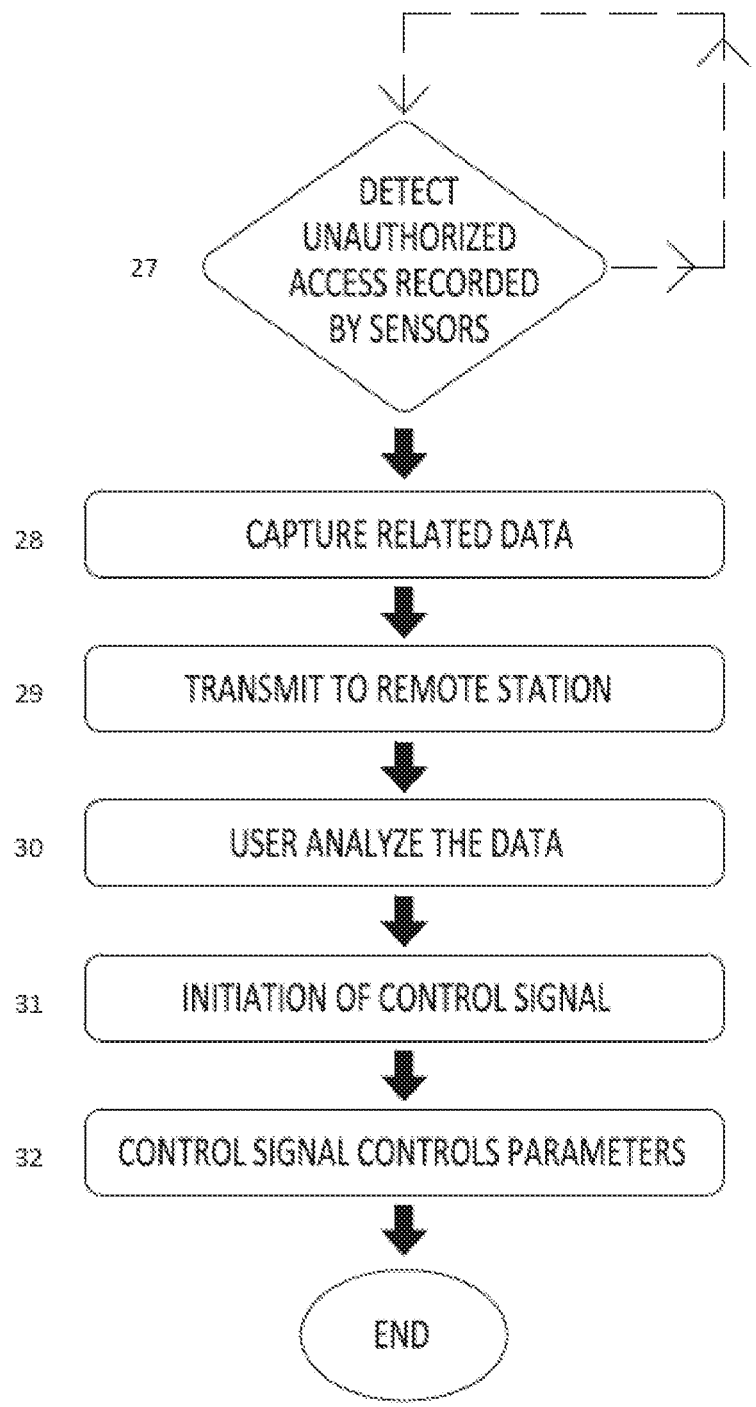
FIG. 3 is a flowchart showing communication of sensor data from an electric fence location to at least one user at a remote location, in accordance with an example embodiment.

FIG. 3 is a flowchart that shows a process for providing sensor data from an electronic fence location to at least one user at a remote location with the at least one user subsequently initiating a response remotely to the electronic smart fence location. It one embodiment, the at least one sensor may detect unauthorized activity. The unauthorized activity is recorded by sensors (27). The electronic fence system may then capture related data (28) and optionally make one or more determinations as to the nature of the unauthorized access and whether at least one notification is needed. The electronic fence system may then transmit the sensor data related to the unauthorized access to a remote station (29) for at least one user. The at least one user may then analyze the data (30) and provide manual inputs to a wireless device using a mobile app or internet based application. Thus, the at least one user may cause the initiation of a control signal (31) via the wireless device. The control signal is sent to the electronic fence location to manipulate one or more control signal controls parameters (32). Thus, the at least one user is able to monitor and secure the electronic fence location remotely.

Figure 4:
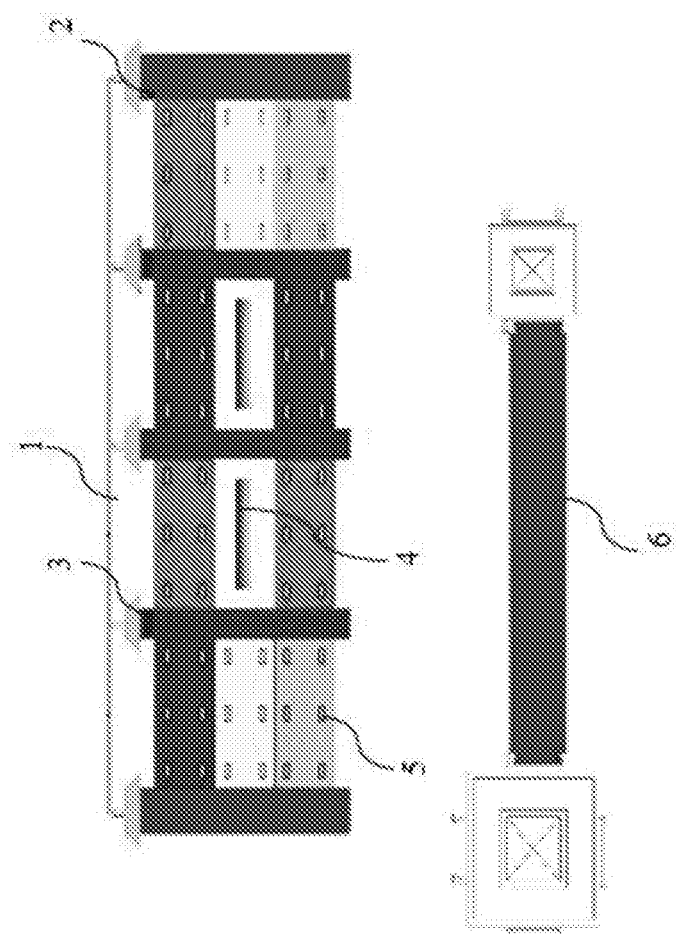
FIG. 4 shows the electric fence system including a multitude of colors and materials targeted for the electric fence barrier system, in accordance with an example embodiment.

FIG. 4 is a diagram that shows a working model of the remotely controlled electronic fence. In one embodiment, the electronic fence includes a spray pipe (1) to facilitate a misting device as previously described to provide a cooling spray on a hot day. In another embodiment, the electronic fence includes at least one image capturing device (2) to capture at least one image of one or more unauthorized intruder and/or object. At least image may be sent to at least one user via a mobile app and/or another like internet based application. In one embodiment, the electronic fence includes at least one microphone (3) to provide at least one recording and/or warning for one or more unauthorized intruders and/or objects. The at least one recording may be sent to at least one user via a mobile app and/or another like internet based application. The at least one user may subsequently issue the at least one warning remotely. In one embodiment, the electronic fence may include a variety of means for sensing including radar, lidar, and other like means. In one embodiment, the electronic fence may include a display unit configured to show the current humidity, temperature, weather forecast, and other like information of interest to the at least one user. In one embodiment, the electronic fence may include downloadable or streaming entertainment including sports, movies, and other like content. In one embodiment, the devices and/or sensors described including the image gathering device, such as a camera (2), microphone (3), speakers, and/or display unit may be powered with at least one solar panel, such as the at least one solar panel hood described. In one embodiment, the electronic fence may be adapted to other power supply sources and may be convenient for the at least one user and the location. In one embodiment, the electronic fence may include at least one lighting unit (4), such as a LED display. As previously described, the lighting unit (4) may be used to provide a festive or entertaining environment. In one embodiment, the electronic fence may include slots (5) to reduce wind pressure. Furthermore, the electronic fence may include panels (6), pillars, and openings that are adjustable by the at least one user for convenience and the requirements of the fenced area.

In one embodiment, an intrusion by an unauthorized intruder and/or object within the fenced area may activate one or more triggers including sensing triggers. Such sensing may include the inventive aspects discussed, such as the image capturing device to record one or more images. The one or more images may be subsequently sent as an alert to at least one user via a real-time secured network data communication. The at least one user may receive and view the alert as a real time warning and, further, could view live footage on one or more devices through a mobile app or internet based application. In another embodiment, the at least one user may listen to the at least one occurrence via an onsite microphone and, further, issue at least one warning through the speaker system to the at least one intruder and/or object. These communications may occur via a real time secured network using wireless technology to communicate with a mobile app or internet based application.

Figure 5:
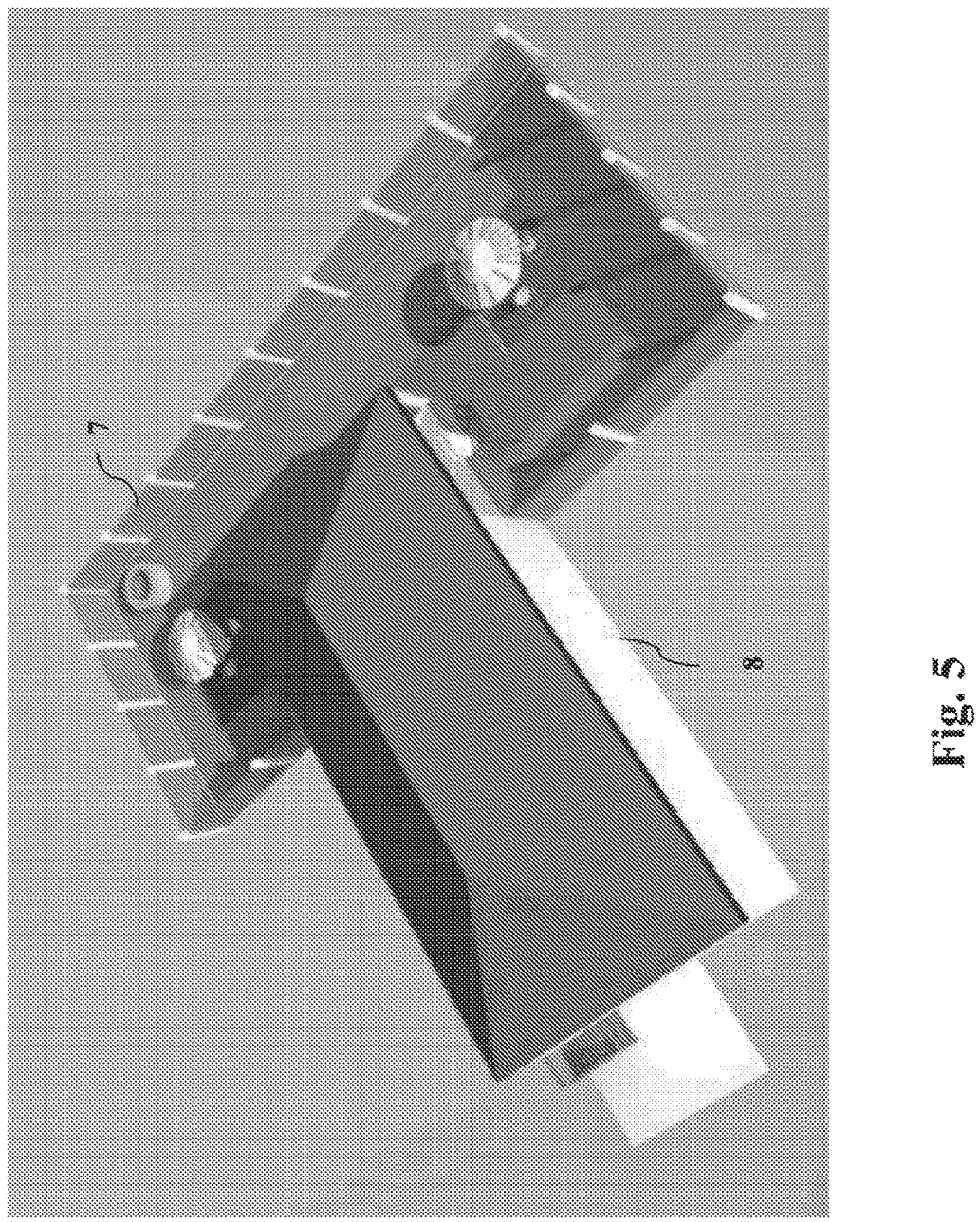
FIG. 5 shows an electronic fence system integrated with a personal residence, in accordance with an example embodiment.

FIG. 5 is a diagram of an electronic fence system integrated with a personal residence, in accordance with an example embodiment. In one embodiment, the electronic fence (7) may surround a part of a residence (8) or enclose an entire residence. In another embodiment, the electronic fence creates a personal space for leisure by affecting the physical environment and/or providing entertainment. In one embodiment, the electronic fence may help to create a personal leisure space by the control and powering of a misting device for cooling on a hot day for at least one user. In one embodiment, the electronic fence may provide entertainment such as musical audio, light displays, news information, interactive displays, and other like entertainment as has been discussed.

In one embodiment, the described remotely controlled electronic fenced system may be used for domestic purposes, such as to protect the front and back yards of a personal residence. In another embodiment, this type of electronic fencing could be used by commercial or military establishments for an open air storage yard. In one embodiment, the electronic fence may be adapted by a country's government for a security border fence. The present disclosure is intended to save manpower and money as well as create a unique experience for the user with the help of a mobile app or web technology. The electronic fence can be formed by the present disclosure to provide the needed detection of any intruder and/or object that has penetrated the inside of the electronic fence and/or is within a designated distance from the electronic fence. Further, in one embodiment, the quality of the camera, microphone, speaker, and lighting unit could be changed and/or adapted according to the requirements of the user. In addition, the fence pillar could be modified according to the soil conditions and may also include either a colorful, multi-colored, or plain surface as chosen by at least one user. Furthermore, the structure is designed to be produced economically by adapting relatively inexpensive materials for use.

It is to be understood that the above description is intended to be illustrative, and not restrictive. For example, the above-discussed embodiments may be used in combination with each other. Other embodiments not described explicitly are inherent and/or obvious to one of ordinary of skill in the art upon reviewing the above description.

The benefits and advantages which may be provided by the present disclosure have been described above with regard to specific embodiments. These benefits and advantages, and any elements or limitations that may cause them to occur or to become more pronounced are not to be construed as critical, required, or essential features of any or all of the embodiments.

While the present disclosure has been described with reference to particular embodiments, it should be understood that the embodiments are illustrative and that the scope of the disclosure is not limited to these embodiments. Many variations, modifications, additions and improvements to the embodiments described above are possible. It is contemplated that these variations, modifications, additions and improvements fall within the scope of the disclosure.

What is claimed is:

1. A method for operating an electronic fence, the method comprising:
   providing the electronic fence with one or more vertical poles having a fence structure extending between each of the one or more vertical poles;
   installing one or more devices on the electronic fence, wherein one of the one or more devices is a humidifying device configured to provide a chilling area using a cooling spray;
   positioning the humidifying device at a position above at least a portion of the fence structure to providing environmental cooling at the position;
   providing a solar panel hood at a top of at least one of the one or more vertical poles to power said one or more devices;
   capturing data with one or more sensors installed on the electronic fence;
   wirelessly transmitting notification messages based on the captured data to a remote device;
   receiving one or more control instructions from the remote device, the control instructions being based on the captured data; and
   controlling the one or more devices installed on the electronic fence based on the received one or more control instructions.

2. The method of claim 1, wherein the remote device receives the captured data from a transmission module of the electronic fence.

3. The method of claim 1, further comprising:
   enclosing at least one of a personal residence, a commercial enterprise, a military base, or a security border fence with the electronic fence.

4. The method of claim 1, further comprising:
   installing a plurality of entertainment devices on the electronic fence including at least an audio system, radio, lighting unit, or a video display, a device that transmits information audio, or video displays.

5. The method of claim 1, further comprising:
   installing one or more of an image capturing device, microphone, motion detector, night vision device, radar or lidar devices on the electronic fence.

6. An electronic fence system comprising:
   a processor and a memory, wherein the memory comprises non-transitory computer-readable-medium having computer-executable instructions stored therein that, when executed by the processor, causes the processor to capture data with one or more sensors installed on an electronic fence;
   a fence structure extending between a plurality of vertical posts;
   a solar panel hood secured at a top of at least one of the plurality of vertical posts;
   at least one humidifying device secured at a position above at least a portion of the fence structure wherein the one or more humidifying device is configured to provide a chilling area using a cooling spray to provide cooling to the position, the at least one humidifying device is in electronic communication with the processor and memory and is powered by the solar panel hood
   wherein the processor and memory are configured to wirelessly transmit notification messages to a remote device, the notification messages being based on the captured data from the one or more sensors;
   wherein the processor and memory are configured to receive one or more control instructions from the remote device, the control instructions being based on the captured data from the one or more sensors; and
   wherein the processor and memory are configured to control at least one or more devices installed on the fence based on the received one or more control instructions.

7. The electronic fence system as claimed in claim 6, wherein the one or more sensors are built in the fence.

8. The electronic fence system as claimed in claim 6, wherein the one or more sensors include at least one of an image capturing device, microphone, motion detector, night vision device, radar, or lidar device.

9. The electronic fence system as claimed in claim 6, further comprising an entertainment system is installed in the fence.

10. The electronic fence system as claimed in claim 6, wherein the one or more sensors are interconnected.

11. The electronic fence system as claimed in claim 6, wherein the one or more sensors are configured to determine an object or intruder in the monitored area.

12. The electronic fence system as claimed in claim 6, wherein the functionalities of the one or more sensor are interactive and are configured to be updated and interconnected using an interface device.

13. The electronic fence system as claimed in claim 6, wherein a plurality of functions of the one or more sensors are configured to be optimized remotely by an application in a remote device.

14. The electronic fence system as claimed in claim 6, wherein the system fence is comprised of parallel portions that are configured to extend and cover a contour area.

15. The electronic fence system as claimed in claim 6, wherein the remote device is smart phone.

16. The electronic fence system as claimed in claim 6, wherein the at least one humidifying device is configured to control humidity and/or misting devices are configured to control humidity or temperature of the electronic fence environment.

* * * * *